United States Patent [19]

Dieterich

[11] Patent Number: 5,249,228
[45] Date of Patent: Sep. 28, 1993

[54] CABLE TELEVISION SIGNAL SCRAMBLING SYSTEM

[75] Inventor: Charles B. Dieterich, Kingston, N.J.

[73] Assignee: RCA Thomson Licensing Corporation, Princeton, N.J.

[21] Appl. No.: 902,246

[22] Filed: Jun. 22, 1992

[51] Int. Cl.⁵ .............................. H04N 7/167
[52] U.S. Cl. ........................... 380/7; 380/8; 380/20; 358/167
[58] Field of Search .............. 380/6, 7, 8, 10, 20; 455/1, 26.1; 358/166, 167, 905, 187, 177, 178

[56] References Cited

U.S. PATENT DOCUMENTS 3,347,982  10/1967  Bass et al.
4,621,288  11/1986  Yamada et al. ............... 358/167 X
4,748,677   5/1988  Farmer et al. ................ 380/7
4,777,648  10/1988  Gardner ........................ 380/7
4,912,557   3/1990  Faroudja ...................... 358/167
5,065,242  11/1991  Dieterich et al. ............. 358/167
5,133,009   7/1992  Rumreich ...................... 380/10

Primary Examiner—Tod R. Swann
Attorney, Agent, or Firm—Joseph S. Tripoli; Eric P. Herrmann; Ronald H. Kurdyla

[57] ABSTRACT

In a cable television system an interferer signal is inserted into the video signal for scrambling purposes except during a vertical blanking reference interval containing a reference signal for use by a video equalizer in a television receiver to help reduce multipath distortion such as image ghosts.

6 Claims, 1 Drawing Sheet

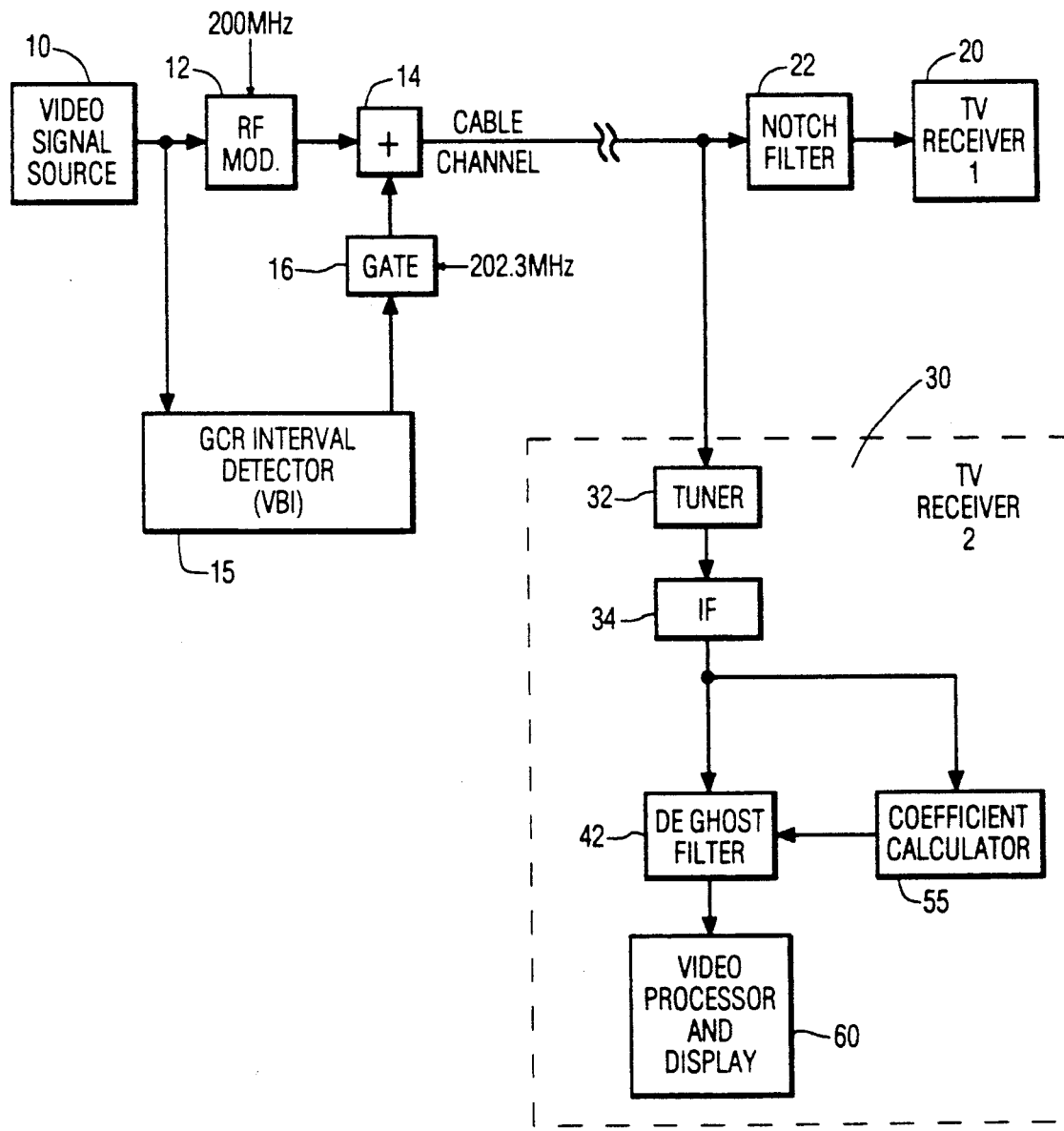

CABLE TELEVISION SIGNAL SCRAMBLING SYSTEM

FIELD OF THE INVENTION

This invention concerns apparatus for modifying (scrambling) a television signal provided by a cable television system so as to render video information essentially unviewable by a non-subscriber to a particular cable television service. In particular, the invention concerns such a cable television system which provides service to television receivers including video signal equalizing apparatus.

BACKGROUND OF THE INVENTION

Cable television systems which provide pay televisions service to subscribers via a cable connection for a fee are well known in the United States and elsewhere. Since cable signals may be connected to receivers of both subscribers and non-subscribers (e.g., former subscribers who have terminated service but remain connected to the cable), the cable signals typically are scrambled to prevent unauthorized use by non-subscribers. Scrambling is often accomplished simply and economically by injecting an interferer signal into the video signal so as to render the video signal unviewable. Unscrambling at a subscriber's receiver is accomplished by using a notch filter to trap out the interferer signal.

In accordance with the principles of the present invention, it is herein recognized that the effectiveness of cable television scrambling/descrambling systems of the interferer signal type may be jeopardized by receivers of non-subscribers which incorporate a video signal equalizer to compensate for phase or frequency disturbances caused by transmission channel (cable) characteristics. Such equalizers typically operate to make certain characteristics of a received video signal, e.g., frequency, phase or energy, match or approximate a desired response or contour.

A television signal deghosting system is a type of video signal equalizer which removes or reduces video signal multipath distortion. These systems can be used with both broadcast and cable television signals, and may employ techniques at a receiver for comparing a received test signal with an ideal version of the test signal in order to configure an adaptive filter to remove multipath ("ghost") components from the received signal. One deghoster system, described in U.S. Pat. No. 5,065,242—Dieterich et al., incorporates a repetitive pseudorandom number sequence test signal in a horizontal line within a vertical blanking interval of a television signal. At a receiver, the received test signal and a locally provided ideal version of the test signal are compared and processed for generating coefficients for an adaptive multipath correction filter.

SUMMARY OF THE INVENTION

In accordance with the principles of the present invention, in a cable video system wherein an interferer signal is inserted into a video signal for scrambling purposes, the interferer signal is inhibited during a video signal reference interval which is expected to contain a reference signal for use by an equalizer to compensate the video signal such as by removing multipath distortion, e.g., image ghosts.

DETAILED DESCRIPTION OF THE DRAWING

In the single FIGURE of the drawing, a television video signal source 10 at a cable television transmitting facility provides a 0–4.2 MHz baseband video signal to a radio frequency (RF) modulator 12. In unit 12 the video signal modulates an RF video carrier with a frequency $F_v$ of 200 MHz. The modulated RF video carrier from unit 12 is applied to one input of a combiner 14.

Another input of combiner 14 receives a 202.3 MHz sinusoidal interferer signal via a gate 16, e.g., an electronic switch, the purpose and operation of which will be discussed shortly. The interferer signal is such that, when added to the RF spectrum via combiner 14, the television signal video component of the output signal from combiner 14 will be unviewable at a television receiver unless special steps are taken. The illustrated baseband frequency spectrum of the cable television signal shows a 2.3 MHz baseband interferer component situated approximately midband in the video spectrum. In the illustrated embodiment a first television receiver 20 of a cable television service subscriber is enabled to receive a viewable image by means of a 202.3 MHz notch filter 22 (trap) which rejects the 202.3 MHz interferer signal component of the received cable television signal.

A second television receiver 30 of a non-subscriber also is connected to the television cable channel. Receiver 30 includes video signal equalizing apparatus in the form of a multipath (ghost) reduction network of the type described in U.S. Pat. No. 5,065,242—Dieterich et al. An input cable television signal is processed by an RF tuner 32 and an intermediate frequency (IF) processor 34 for producing a detected baseband video signal, which is applied to an adaptive deghosting filter 42 and to a coefficient calculator 55. Coefficients calculated by unit 55, as discussed in the Dieterich patent, modify the response of filter 42 so as to reduce or eliminate image ghosts in the video signal applied to video processor and display unit 60. Briefly, a test signal situated in a horizontal line of a vertical blanking interval of the received cable television signal, and a locally provided ideal version of the test signal, are compared and processed for generating multipath correction coefficients for filter 42.

The deghosting apparatus including units 42 and 55 acts as a video signal equalizer with respect to multipath distortion in the received video signal, by attempting to make the contour of the received test signal energy spectrum equal or approximate that of the locally provided ideal version of the test signal. Accordingly, the deghosting apparatus of receiver 30 is capable of sensing the energy associated with the interferer signal, and rejecting the interferer signal by placing a notch at the 2.3 MHz baseband interferer frequency. This would negate the desired video signal scrambling with respect to non-subscriber receiver 30, and is prevented by the operation of a unit 15 in combination with gate 16.

Unit 15 includes line counter circuits synchronized by the vertical synchronizing pulse to detect the presence of the horizontal line (or lines) in the vertical blanking interval containing a Ghost Cancelling Reference Signal, e.g., a test signal such as the pseudorandom number sequences discussed in U.S. Pat. No. 5,065,242. When the reference interval is detected, unit 15 provides an output control signal to gate 16 for inhibiting the passage of the 202.3 MHz interferer signal to unit 14 and the cable television signal channel. That is, normally conductive gate 16 is rendered non-conductive in response to the control signal from unit 15. Thus the deghosting apparatus in non-subscriber receiver 30 will not "see" the interferer signal, whereby the cable television video information will remain unviewable by receiver 30.

What is claimed is:

1. In a television signal transmitter system for providing a subscriber television signal containing image information intended to be viewed at receivers of subscribers and unviewable at receivers of non-subscribers, transmitter apparatus comprising:

means for providing a television signal including video information to be displayed by a television signal receiver;

means for providing an interferer signal for distorting said video information;

means for selectively combining said television signal and said interferer signal except during a reference interval containing a reference signal for use by video signal channel phase or frequency equalizing means in a television receiver; and means for coupling an output of said combining means to a subscriber television channel.

2. Apparatus according to claim 1, wherein said video information modulates a radio frequency video carrier; and said interferer signal is a radio frequency signal at a frequency other than the frequency of said video carrier.

3. Apparatus according to claim 2, wherein said interferer is a sinusoidal signal; and said video carrier and said interferer signal exhibit a frequency difference corresponding to a frequency within a baseband frequency range of said video information.

4. Apparatus according to claim 3, wherein said frequency difference corresponds to a frequency approximately in the middle of said baseband frequency range.

5. Apparatus according to claim 1, wherein said reference signal is a ghost cancelling reference signal.

6. Apparatus according to claim 5, wherein said reference interval is within a vertical blanking interval.

* * * * *